(12) United States Patent
Okuno

(10) Patent No.: US 7,657,711 B2
(45) Date of Patent: Feb. 2, 2010

(54) DYNAMIC MEMORY BANDWIDTH ALLOCATION

(75) Inventor: Kenichi Okuno, Kanagawa (JP)

(73) Assignee: Sony Corporation, Tokyo (JP)

( * ) Notice: Subject to any disclaimer, the term of this patent is extended or adjusted under 35 U.S.C. 154(b) by 238 days.

(21) Appl. No.: 10/935,608

(22) Filed: Sep. 7, 2004

(65) Prior Publication Data

US 2005/0086425 A1 Apr. 21, 2005

(30) Foreign Application Priority Data

Sep. 8, 2003 (JP) .............................. 2003-315731

(51) Int. Cl.
*G06F 13/30* (2006.01)
(52) U.S. Cl. ..................... 711/151; 711/167; 710/33; 710/36
(58) Field of Classification Search ................. None
See application file for complete search history.

(56) References Cited

U.S. PATENT DOCUMENTS

| | | | | |
|---|---|---|---|---|
| 5,634,004 A | * | 5/1997 | Gopinath et al. ............ 710/317 |
| 5,659,715 A | * | 8/1997 | Wu et al. ..................... 711/170 |
| 6,098,123 A | | 8/2000 | Olnowich | |
| 6,434,688 B1 | * | 8/2002 | Rhoden et al. ................ 712/34 |
| 6,501,734 B1 | * | 12/2002 | Yu et al. ....................... 370/236 |
| 6,611,260 B1 | * | 8/2003 | Greenberg et al. ........... 345/204 |
| 6,903,733 B1 | * | 6/2005 | Greenberg et al. ........... 345/204 |

FOREIGN PATENT DOCUMENTS

| | | |
|---|---|---|
| JP | 63-132369 | 6/1988 |
| JP | 3-273353 | 12/1991 |
| JP | 5 151138 | 6/1993 |
| JP | 5 233482 | 9/1993 |
| JP | 10 340243 | 12/1998 |
| JP | 2000 330923 | 11/2000 |

* cited by examiner

*Primary Examiner*—Than Nguyen
(74) *Attorney, Agent, or Firm*—Frommer Lawrence & Haug LLP; William S. Frommer; Thomas F. Presson

(57) ABSTRACT

A memory bandwidth control device for improving efficiency of data transfer between an external device and a memory. A memory is used for temporarily storing and outputting data to be communicated with external devices being connected via input/output ports, and an I/O buffer dynamically assigns memory bandwidth to external devices requesting data transfer when receiving the data transfer requests from the external devices to the memory. When compared to assigning fixed memory bandwidth, efficiency of data transfer to the memory can be significantly improved without wasting memory bandwidth.

6 Claims, 4 Drawing Sheets

DYNAMIC MEMORY BANDWIDTH ALLOCATION

BACKGROUND OF THE INVENTION

1. Field of the Invention

This invention relates to a memory bandwidth control device and, more particularly, is suitably applied to a memory bandwidth control device for temporarily storing in a memory material data such as video and audio, which is externally entered to a video editing apparatus, and then processing the material data via the memory or performing memory bandwidth control for a burst transfer to a hard disk drive.

2. Description of the Related Art

To store material data received from an external device via an input/output port in a hard disk drive, a video editing apparatus temporarily stores the material data by a prescribed amount or more in a memory and then performs a burst transfer of the data to the hard disk drive, so as to transfer data in a short time with improved transfer efficiency.

Further, to edit material data, the video editing apparatus gives material data being stored in the hard disk drive, to an external device such as an effector via the memory, to edit the data, and then performs the burst transfer of the edited material data via the memory, thereby storing it in the hard disk again or outputting them to the outside.

As described above, the video editing apparatus communicates material data with the hard disk drive via the memory. Therefore, memory bandwidth should be controlled between the memory and a plurality of external devices being connected to the video editing apparatus via input/output ports.

In a case where memory bandwidth (bit width×clock number) is 100 Mbps and there are 10 external devices, the video editing apparatus equally divides the memory bandwidth by the number of the external devices simply, resulting in assigning 0.1 second to the devices with time division (10 Mbps).

By the way, such a video editing apparatus assigns fixed memory bandwidth to each external device being connected thereto via an input/output port, by means of time division. Therefore, the number of external devices to be connected is limited according to the memory bandwidth. In addition, bandwidth assigned external devices which do not receive and output material data is useless, resulting in deteriorated data transfer efficiency.

SUMMARY OF THE INVENTION

In view of the foregoing, an object of this invention is to provide a memory bandwidth control device capable of significantly improve efficiency of data transfer between an external device and a memory.

The foregoing objects and other objects of the invention have been achieved by the provision of a memory bandwidth control device comprising: a memory to be used to temporarily store and output data to be communicated with external devices being connected via input/output ports; and a controller for, when receiving data transfer requests to the memory from external devices, dynamically assigning memory bandwidth to the input/output ports of the external devices requesting the data transfer. As a result, as compared with a case of assigning fixed memory bandwidth, the memory bandwidth can be used efficiently. This results in significantly increasing efficiency of data transfer to the memory without wasting the memory bandwidth, thus making it possible to realize a memory bandwidth control device capable of significantly improve efficiency of data transfer between an external device and a memory.

Further, this invention provides a memory bandwidth assignment method comprising: a data transfer request acceptance step of accepting data transfer requests to a memory, the data communicated with external devices being connected via input/output ports, the memory used to temporarily store and output the data; and a control step of dynamically assigning memory bandwidth to the input/output ports of the external devices requesting the data transfer. This results in significantly increasing efficiency of data transfer to the memory without wasting the memory bandwidth, as compared with a case of assigning fixed memory bandwidth, thus making it possible to realize a memory bandwidth assignment method capable of significantly improve efficiency of data transfer between an external device and the memory.

Still further, this invention provides a memory bandwidth assignment program causing an editing apparatus to execute: a data transfer request acceptance step of accepting data transfer requests to a memory, the data communicated with external devices being connected via input/output ports, the memory used to temporarily store and output the data; and a control step of dynamically assigning memory bandwidth to the input/output ports of the external devices requesting the data transfer. This resulting in significantly improving efficiency of data transfer to the memory without wasting the memory bandwidth, as compared with a case of assigning fixed memory bandwidth, thus making it possible to realize a memory bandwidth assignment program capable of significantly improve efficiency of data transfer between an external device and a memory.

The nature, principle and utility of the invention will become more apparent from the following detailed description when read in conjunction with the accompanying drawings in which like parts are designated by like reference numerals or characters.

DETAILED DESCRIPTION OF THE EMBODIMENT

Preferred embodiments of this invention will be described with reference to the accompanying drawings:

(1) Circuit Construction of Memory Bandwidth Control Device

Figure 1:
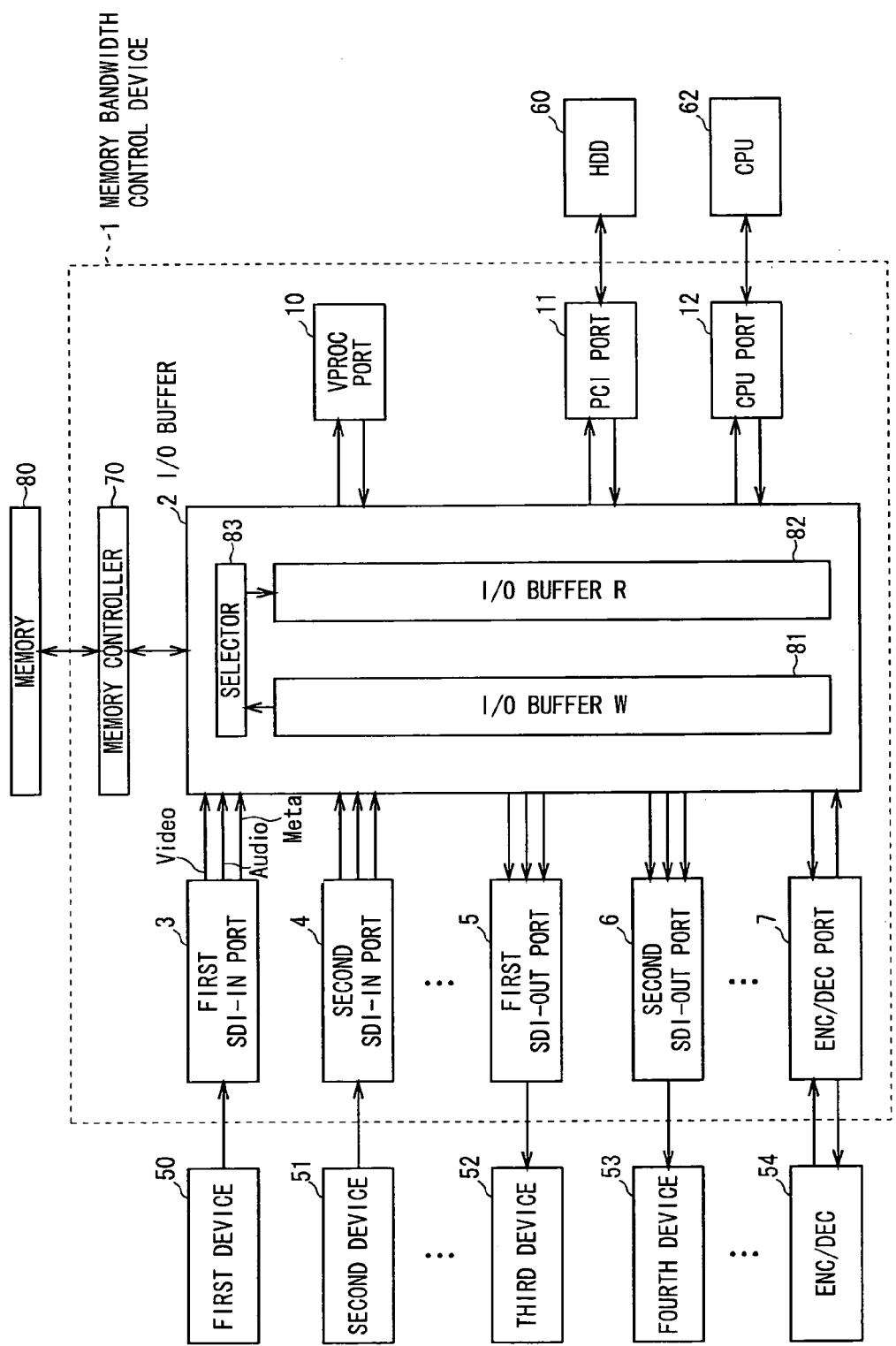
FIG. 1 is a schematic block diagram showing a circuit construction of a memory bandwidth control device according to this invention.

Referring to FIG. 1, reference numeral 1 shows a memory bandwidth control device of this invention which is installed in an editing apparatus, for communicating material data with a hard disk drive (HDD) 60 via a memory 80 comprising, for example, a Double Data Rate-Synchronous Dynamic Random Access Memory (DDR-SDRAM).

The memory bandwidth control device 1 is constructed in the Field Programmable Gate Array (FPGA), and is designed to communicate material data with first to fourth devices 50 to 53, an encoder/decoder (ENC/DEC) 54 and a CPU 62 being connected to an I/O buffer 2 via various input/output ports such as a first Serial Data Interface (SDI)-IN port 3, a second SDI-IN port 4, a first SDI-OUT port 5, a second SDI-OUT port 6, an ENC/DEC port 7, and a CPU port 12 and to write/read the material data via the memory 80 in/from a hard disk drive (HDD) 60 being connected via a peripheral component interconnect (PCI) port 11.

Note that video data, audio data and meta data composing material data can be communicated via three read ports or three write ports for three kinds of data transfers between the I/O buffer 2, and the first and second SDI-IN ports 3 and 4 and the first SDI-OUT ports 5 and 6.

Further, data can be communicated via one read port and one write port between the I/O buffer 2, and the ENC/DEC port 7, the PCI ports 11 and the CPU port 12.

In addition, there is a video process (VPROC) port 10 as a port which is not connected to the outside, and data can be communicated via a single or plural read ports and write ports according to necessity between the VPROC port 10 and the I/O buffer 2.

The I/O buffer 2 is a module for mediating data transfer between the memory 80 and an input/output port via a memory controller 70, and includes inside a write-only I/O buffer W 81 and a read-only I/O buffer R 82. The I/O buffer W 81 and the I/O buffer R 82 are switched by a selector 83 depending on writing operation or readout operation.

The I/O buffer W 81 and the I/O buffer R 82 absorb a difference in a transfer rate between an input/output port and the memory 80, so as to improve efficiency of continuous burst transfer to the memory 80.

This memory bandwidth control device 1 dynamically assigns memory bandwidth to input/output ports requesting data transfers, out of the first SDI-IN port 3, the second SDI-IN port 4, the first SDI-OUT port 5, the second SDI-OUT port 6, the ENC/DEC port 7, the VPROC port 10, the PCI port 11, and the CPU port 12, and makes handshaking with the input/output ports for the assignment of the memory bandwidth.

Basically, an input/output port outputs a data transfer request (Request) to the I/O buffer 2 at a time of writing or reading data in/from the memory 80, and the I/O buffer 2 assigns required bandwidth to the input/output port requesting the data transfer and outputs a response signal (Acknowledge) to the input/output port, so as to inform the input/output port of the reservation of the memory bandwidth.

Note that each input/output port includes a single or plural read/write ports, and communication with the I/O buffer 2 is made on a read port/write port basis.

(2) Summary of Bandwidth Assignment Process

Figure 2:
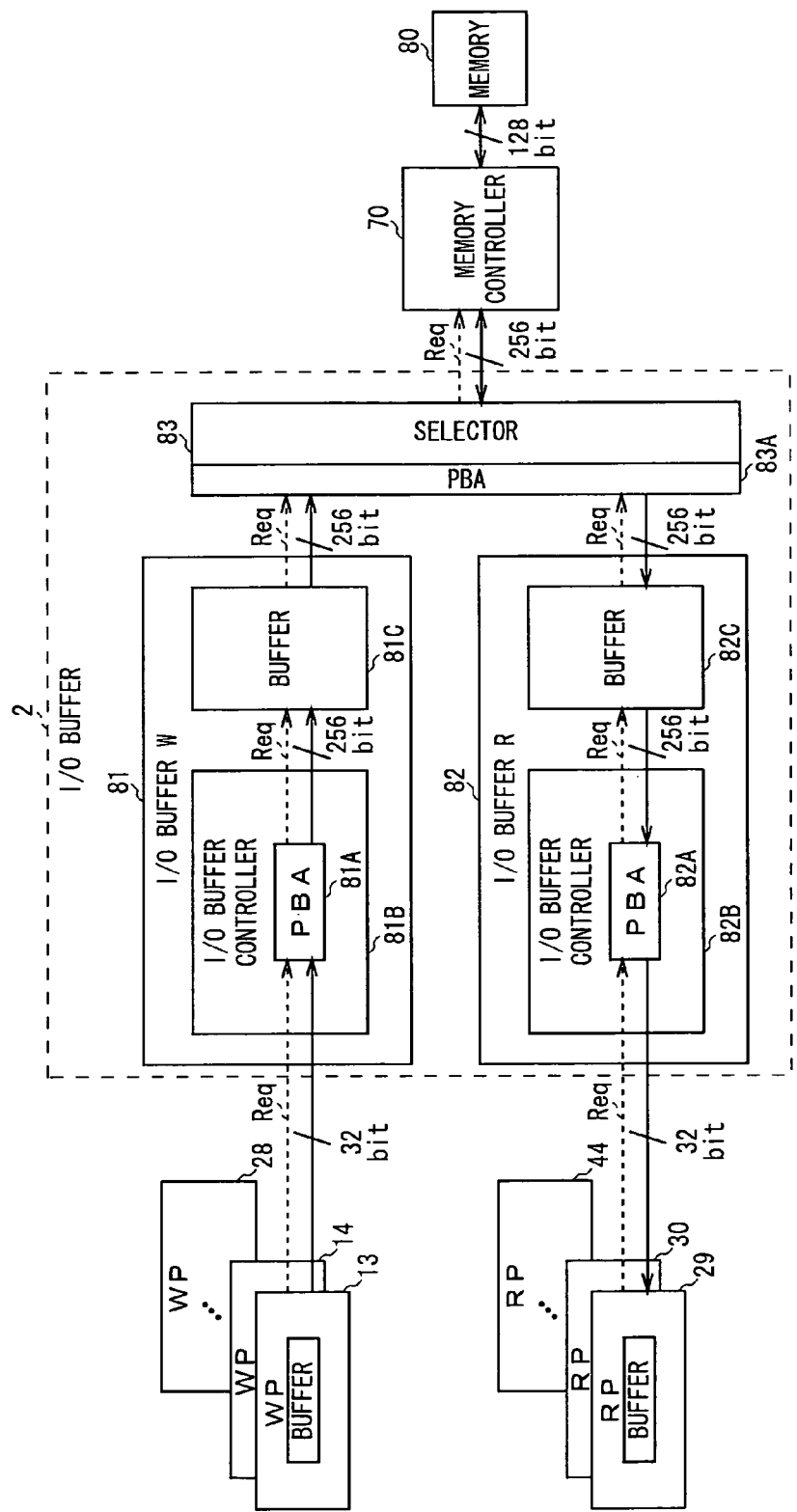
FIG. 2 is a schematic block diagram explaining a process of bandwidth assignment to an input/output port.

Sequentially, a process of bandwidth assignment to read/write ports which the I/O buffer 2 executes with a memory bandwidth assignment program will be described with reference to FIG. 2.

For example, when the I/O buffer W 81 of the I/O buffer 2 receives data transfer requests (Request) from a single or plural write ports 13, 14, . . . , 28, an I/O buffer controller 81B having a passive band allocation circuit 81A (hereinafter, referred to as PBA circuit, simply) dynamically assigns memory bus bandwidth between the I/O buffer 2 and the memory 80 to the write ports 13, 14, . . . , 28 sending the data transfer requests.

The I/O buffer controller 81B converts material data to be written, sequentially received with a 32-bit-width data bus from the write ports 13, 14, . . . , 28, which have been assigned the memory bandwidth by the PBA circuit 81A, so as to send the data to the buffer 81C with a 256-bit-width data bus. When data of a prescribed size is stored in the buffer 81C, the I/O buffer controller 81B outputs a data transfer request (Request) to a PBA circuit 83A of the selector 83.

The PBA circuit 83A of the selector 83 alternatively switches between the I/O buffer W 81 and the I/O buffer R 82 which communicate data with the memory 80, depending on whether a data transfer request (Request) has come from the I/O buffer W 81 or I/O buffer R 82.

The memory controller 70 transfers from the I/O buffer W 81 to the memory 80 the material data to be written, received from any of the first SDTI-IN port 3, the second SDTI-IN port 4, the ENC/DEC port 7, the VPROC port 10, the PCI port 11 and the CPU port 12 while the selector 83 selects the I/O buffer W 81. And while the I/O buffer R 82 is selected, the memory controller 70 outputs the material data read from the memory 80, to any of the first SDI-OUT port 5, the second SDI-OUT port 6, the ENC/DEC port 7, the VPROC port 10, the PCI port 11, and the CPU port 12, via the I/O buffer R 82.

Note that the I/O buffer R 82 performs the same process as the I/O buffer W 81 although they are different in writing operation and readout operation, and its explanation will be omitted.

(2-1) Operation of I/O buffer W

The operation of the I/O buffer W 81 at a time of sequentially performing a burst transfer of material data to be written, to the memory 80 via a write port 13, 14, . . . , 28 of an input/output port will be now described with reference to FIG. 3.

Each write port 13, 14, . . . , 28 has a buffer inside, and outputs a data transfer request to the I/O buffer W 81 when 25-Byte material data to be written is stored in the buffer.

When the PBA circuit 81A (FIG. 2) of the I/O buffer W 81 receives a data transfer request from a write port 14, it assigns a smallest-numbered, or, first bank in the buffer 81C, to the write port 14, so as to assign memory bandwidth to the write port 14.

In this case, the I/O buffer controller 81B creates a port table 91 indicating a correspondence between the write port 14 (#2) sending the data transfer request and the order (No. 1) of arrival of the data transfer request, and creates a bank table 92 indicating a correspondence between the write port 14 (#2) and the first bank (1B) assigned.

Then the I/O buffer controller 81B sequentially takes in material data to be written, via a port slot 84 with a 32-bit-width data bus from the write port 14, converts the data with an internal register 87 to output it with a 256-bit-width data bus, and sequentially stores it in the first bank of the buffer 81C via a bank slot 85 at a transfer rate of 256 bits per one clock, thereby storing the material data of 256 Bytes in the fist bank for 8 clocks.

As for the first bank to the sixteenth bank in the buffer 81C, 256 Bytes are set as a unit of data transfer to the memory 80. With this data size, material data to be written can be transferred continuously with a small overhead.

In the I/O buffer W 81, since 256 Bytes are set as a size of burst transfer to the memory 80, a unit of data transfer in the I/O buffer W 81 is basically 256 Bytes.

When material data of 256 Bytes is stored in the first bank, the buffer 81C sends the memory controller 70 a writing request of the material data into the memory 80. When the buffer 81C receives a writing permission, it sequentially transfers the material data of 256 Bytes in total 256 bits at a time to the memory controller 70 via the selector 83.

Since the memory 80 is a double data rate memory, the memory controller 70 transfers the received data to the memory 80 with a 128-bit-width data bus.

Consider now a case where the I/O buffer controller 81B receives a data transfer request (Request) from each write port 13, 14, ..., 28 in an order that material data of 256 Bytes are stored in the write ports 13, 14, ..., 28. Since it takes eight clocks to store material data of 256 bits from each write port 13, 14, ..., 28 to convert data of 32 bits to data of 256 bits with the buffer 86, 87, 88 and eight clocks are divided with time division for the data transfer to the buffer 81C, it is able to simultaneously receive data from eight write ports.

Therefore, memory bandwidth to be assigned to each write port 13, 14, ..., 28 is one-eighth of the memory bandwidth at most. In a case where the memory bandwidth is 1 Gbps, for example, the maximum memory bandwidth for one write port is 125 Mbps.

In a case where memory bandwidth is not required, the memory bandwidth is not assigned unless a transfer request is sent to the I/O buffer W 81.

As described above, the I/O buffer W 81 assigns memory bandwidth according to transfer requests (Request), so that large memory bandwidth can be assigned to a write port having a large amount of data, resulting in efficient data transfer.

At this time, similarly, the I/O buffer controller 81B creates a port table 91 indicating a correspondence between the write ports 13, 14, ..., 28 and the order of arrival of data transfer requests (Request). In addition, the I/O buffer controller 81B assigns each write port 13, 14, ..., 28 to a smallest-numbered free bank of the buffer 81C in the order of arrival of the data transfer requests (Request) and creates a bank table 92 indicating its correspondence.

The port table 91 shows that the write ports 14 (#2), 13 (#1), and 28 (#16) sent the first to third data transfer requests (Request) indicated by Nos. 1, 2, and 3, respectively.

In addition, the bank table 92 indicates the numbers (#2, #1, #16) of the write ports 14, 13, and 28 assigned in the order of arrival of the data transfer requests (request), in association with the second to fourth banks out of the first to sixteenth banks of the buffer 81C.

In this connection, as to the first bank, material data from the second SDI-IN port 4 has been already stored as described above, so that write ports are assigned to the smallest-numbered free bank, or, second and following free banks.

As described above, the I/O buffer controller 81B dynamically assigns the write ports 13, 14, ..., 28 to the banks of the buffer 81C in an order of arrival of data transfer requests (Request) to the PBA circuit 81A.

In this case, memory bandwidth is assigned to three write ports 13, 14, 28, so that, in the order of arrival of the transfer requests, material data of 256 bits from the write port 14 is stored in the second bank for the first one clock, material data of 256 bits from the write port 13 is stored in the third bank for the next one clock, and material data of 256 bits from the write port 28 is stored in the fourth bank for the next one clock.

Then, material data of 256 bits is stored in each write port 13, 14, 28 again after eight clocks, resulting in storing 256-Byte material data to be written, in the second to fourth banks.

The buffer 81C comprises a dual port RAM, and transfers material data of 256 Bytes, 256 bits at a time, from the second bank to the memory 80 via the memory controller 70 according to a writing permission issued from the memory controller 70 when material data of 256 Bytes is stored in the second bank. Similarly, the buffer 81C transfers material data to the memory 80 via the memory controller 70 from the third bank and then from the fourth bank in order.

The buffer 81C comprises a dual port RAM as described above, so that the I/O buffer controller 81B asynchronously stores and reads material data in/from the first to sixteenth banks of the buffer 81C.

Therefore, the buffer 81C is able to transfer material data from the first bank to the memory 80 while I/O buffer controller 81B stores material data in the second to fourth banks, resulting in improving data transfer efficiency.

By the way, the I/O buffer W 81 is used for only writing material data in the memory 80. As compared with a case of alternatively issuing a writing command and a readout command many times, time to switch between the writing operation and the readout operation is not required, resulting in significantly improving data transfer efficiency.

(2-2) Operation of I/O Buffer R

Operation of the I/O buffer R 82 at a time of transferring material data from the memory 80 to read ports 29, 30, ..., 44 via the I/O buffer R 82 will be now described with reference to FIG. 4.

Figure 3:
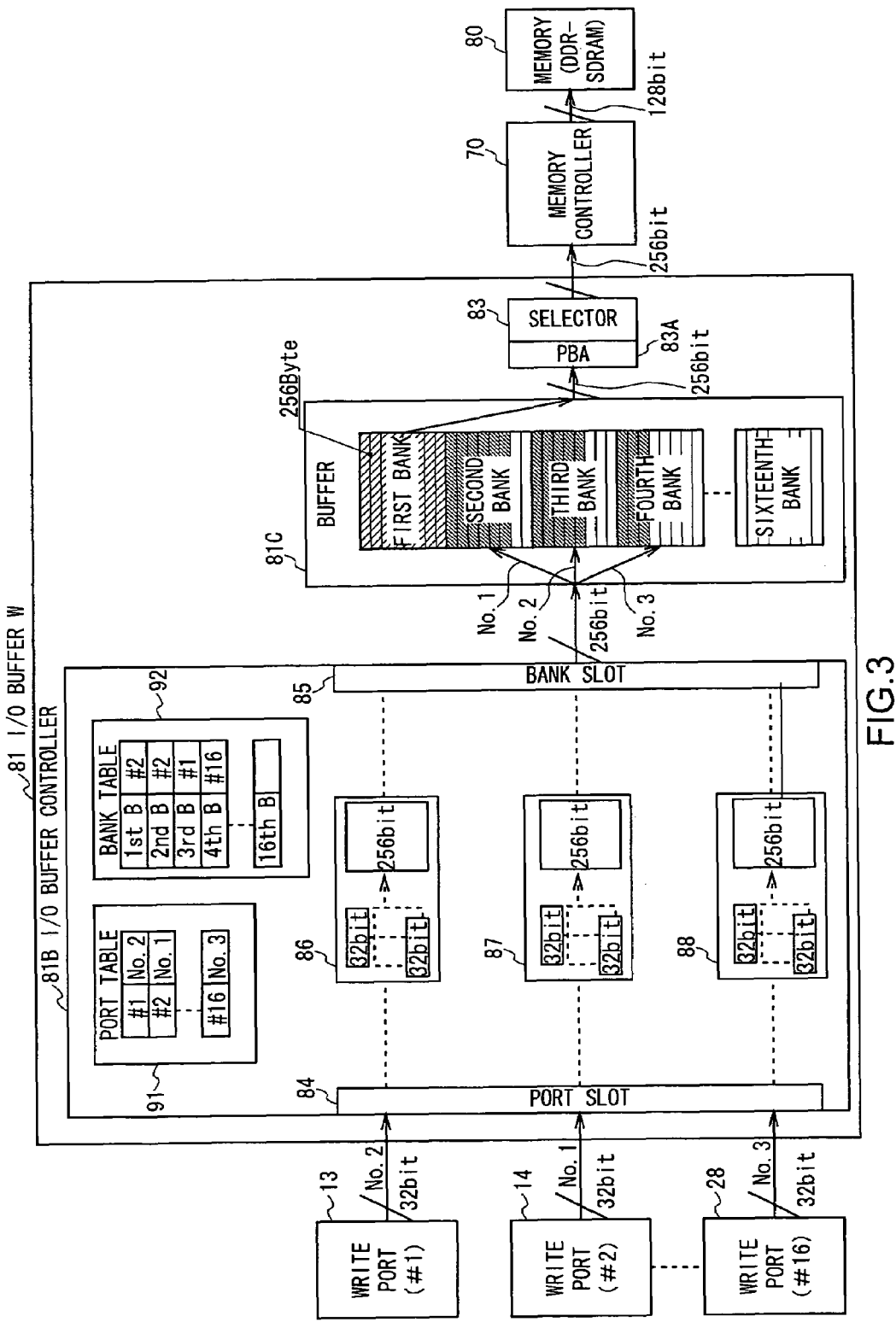
FIG. 3 is a schematic diagram explaining operation of an I/O buffer W.
Figure 4:
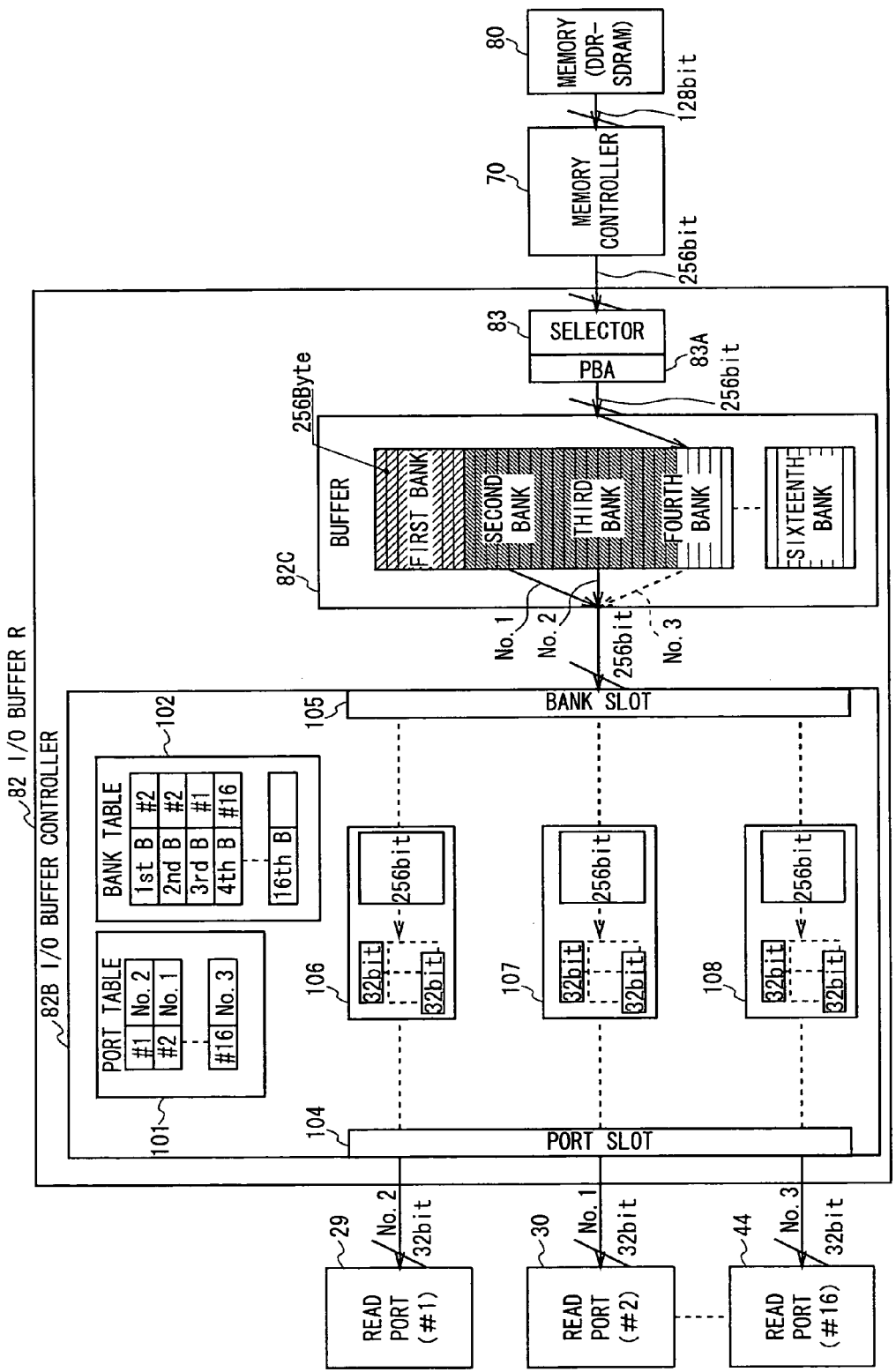
FIG. 4 is a schematic diagram explaining operation of an I/O buffer R.

In FIG. 4 where the same reference numerals are applied to parts corresponding to those of FIG. 3, parts other than the I/O Buffer R 82 which is used instead of the I/O buffer W 81 of FIG. 3 are all the same.

When a PBA circuit (not shown) of the I/O buffer R 82 receives a data transfer request of material data to be read, being stored in the memory 80, from only the read port 30, it assigns memory bandwidth to the read port 30 and assigns the smallest-numbered free bank, or, the first bank of the buffer 82C to the read port 30.

In this case, the I/O buffer controller 82B creates a port table 101 indicating a correspondence between the read port 30 (#2) sending the data transfer request and an order of arrival of its data transfer request (No. 1), and also creates a bank table 102 indicating a correspondence between the read port 30 (#2) and the assigned first bank (1B) with the smallest number of the buffer 82C.

Then the I/O buffer controller 82B issues a data transfer request of material data to be read, to the memory controller 70 via the selector 83, sequentially stores the material data from the memory 80 in the first bank of the buffer 82C at a transfer rate of 256 bits per one clock, thereby storing material data of 256 Bytes in the first bank for eight clocks.

Then the I/O buffer controller 82B takes in the material data of 256 bits from the first bank of the buffer 82C via a bank slot 105, converts it with the register 107 to output it with a 32-bit-width data bus and transfers the data to the read port 30 via a port slot 104, and finishes the data transfer process when the material data of 256 Bytes is stored in the read port 30.

When the I/O buffer controller 82B receives data transfer requests of material data to be read from the memory 80, from read ports 29, 30, ..., 44, it can assign memory bandwidth to the read ports 29, 30, ..., 44 sending the transfer requests.

The I/O buffer controller 82B creates a port table 101 indicating a correspondence between the read ports 29, 30, ..., 44 and an order of arrival of the data transfer requests. In addition, the I/O buffer controller 82B assigns the read ports to the smallest-numbered free banks in the order of arrival of the data transfer requests and creates a bank table 102 indicating its correspondence.

The port table 101 of this case shows that the read ports 30 (#2), 29 (#1), and 44 (#16) sent first to third data transfer requests (Request) indicated by Nos. 1 to 3, respectively.

The bank table 102 shows the numbers (#2, #1, #16) of the read ports 29, 30, ..., 44 assigned to the second to fourth banks out of the first to sixteenth banks of the buffer 82C in the order of arrival of the data transfer requests.

In this connection, as to the first bank, as described above, material data to be read has been stored in response to the data transfer request from the read port 30, the read ports are assigned to the smallest-numbered, or, second and following free banks.

As described above, the I/O buffer controller 82B dynamically assigns the read ports 29, 30, . . . , 44 to banks of the buffer 82C in an order of arrival of data transfer requests to the PBA circuit (not shown).

In actual, similarly to the I/O buffer controller 81B, the I/O buffer controller 82B performs the burst transfer of data of 256 Bytes, 256 bits at a time, from the memory 80 to banks in an order of transfer requests.

In this case, since memory bandwidth is assigned to three read ports 30, 29, and 44 in order, material data of 256 Bytes from the memory 80 is stored in the second bank, the third bank and then the fourth bank in order.

The buffer 82C comprises a dual port RAM, and when material data of 256 Bytes is stored in each of the second to fourth banks, sequentially transfers the material data from the second to fourth bank, 256 bits at a time, to the I/O buffer controller 82B with time division.

The I/O buffer controller 82B converts the material data of 256 bit width into 32 bit width with the registers 106 to 108, and transfers the resultant to the read ports 29, 30, . . . , 44 via the port slot 104.

Since the buffer 82C also comprises a dual port RAM, the I/O buffer controller 82B is able to asynchronously store material data into/from the first to sixteenth banks of the buffer 82C and output material data read from the first to sixteenth banks of the buffer 82C.

Therefore, while the I/O buffer controller 82B stores material data in the second to fourth banks, the buffer 82C is able to transfer material data from the first bank to the read port 30 via the I/O buffer controller 82B, resulting in improving data transfer efficiency.

By the way, the I/O buffer R 82 is used for only readout of material data from the memory 80. As compared with a case of alternatively outputting a writing command and a readout command many times, time to switch between the writing operation and the readout operation is not required, resulting in significantly improving data transfer efficiency.

(3) Operation and Effects

In the above configuration, the I/O buffer 2 of the memory bandwidth control device 1 dynamically assigns memory bandwidth to input/output ports requesting data transfer. Therefore, required memory bandwidth can be assigned according to necessity. As compared with a conventional case of assigning fixed memory bandwidth, memory bandwidth can be prevented from being uselessly assigned, resulting in significantly improving efficiency of data transfer to the memory 80.

The I/O buffer 2 of the memory bandwidth control device 1 dynamically assigns memory bandwidth to input/output ports requesting data transfer. The number of input/output ports to be connected to the I/O buffer 2 is not limited in theory, provided that the memory bandwidth can be assigned within its range, resulting in significantly improving usability without limiting the number of external devices according to the memory bandwidth.

The I/O buffer 81B of the I/O buffer W 81 assigns the second to fourth banks of the buffer 81C, in an increasing numbered order of banks, to the write ports 13, 14, 28 dynamically assigned memory bandwidth in an order of arrival of data transfer requests in order, and stores material data to be written, 256 bits at a time, in the assigned second to fourth banks in order by time-sharing one clock by one clock, resulting in finishing transfer of data of 256 Bytes to be written, to the second to fourth banks almost at the same time.

In a case where data is transferred to the second to fourth banks without time-sharing, material data to be written, from the write ports 13, 14, . . . , 28 should be stored in the registers 86, 87, and 88 once, so that the data transfer of the material data transferred between the I/O buffer controller 81B and the buffer 81C is interrupted by the registers 86, 87 and 88.

The I/O buffer controller 81B, however, stores material data of 256 bits into the second to fourth banks assigned to the write ports 13, 14, . . . , 28 by time-sharing one clock by one clock, resulting in finishing transfer of material data of 256 Bytes in the second to fourth banks almost at the same time and also improving data transfer efficiency with preventing the interruption of transfer of material data in the registers 86, 87 and 88.

This effects are the same in the I/O buffer controller 82B of the I/O buffer R 82.

Since the I/O buffer 2 uses the write-only I/O buffer W 81 and the read-only I/O buffer R 81, time to switch between the writing operation and the readout operation is not required, resulting in significantly improving data transfer efficiency.

In actual, the I/O buffer 2 of the memory bandwidth control device 1 uses the write-only I/O buffer W 81 and the read-only I/O buffer R 82 and the PBA circuit 83A of the selector 83 dynamically switches between the buffers 81 and 82 to gives a writing permission and a readout permission. Therefore, When burst transfer for writing or readout is performed, 256 bits at a time, eight times continuously, the highest use efficiency of 95.16% and 95.84% can be obtained at a clock frequency of 74 MHz and 100 MHz, respectively.

According to the above configuration, the I/O buffer 2 of the memory bandwidth 1 dynamically assigns memory bandwidth to input/output ports requesting data transfer. As compared with a conventional case of assigning fixed memory bandwidth, the efficiency of data transfer to the memory 80 can be significantly improved without wasting memory bandwidth.

(4) Other Embodiments

Note that the above-described embodiment has described a case where material data of 256 Bytes is stored in the first to sixteenth banks of the buffers 81C and 82C by performing the burst transfer, 256 bits at a time, for eight clocks. This invention, however, is not limited to this and material data of 128 Bytes or 512 Bytes can be stored by performing the burst transfer for four clocks or sixteen clocks.

Further, the above-described embodiment has described a case where the I/O buffer 2 executes the above memory bandwidth assignment process with a memory bandwidth assignment program. This invention, however, is not limited to this and the I/O buffer 2 can execute the memory bandwidth assignment process by inserting a program storage medium storing the memory bandwidth assignment program in an editing apparatus.

As a program storage medium which is used for installing the memory bandwidth assignment program to execute the above-described memory bandwidth assignment process in an editing apparatus, not only package media such as flexible disks, compact disc-read only memory (CD-ROM), digital versatile disc (DVD) but also semiconductor memories and magnetic disks capable of temporarily or permanently storing the memory bandwidth program can be used. In addition, as a means for storing the memory bandwidth assignment program in a program storage medium, wired or wireless communication media such as local area networks, the Internet and digital satellite broadcasting can be used. The program can be stored via various communication interfaces such as routers and modems.

Still further, the above-described embodiment has described a case of dynamically assigning memory bandwidth to input/output ports requesting data transfer. This invention, however, is not limited to this and memory bandwidth can be dynamically assigned after a priority order for accepting a data transfer request is given to each input/output port. By doing this, while the number of connectable input/output ports is not limited in theory, a risk in which memory bandwidth is not assigned to devices with higher priority can be previously prevented.

Still further, the above-described embodiment has described a case where the memory bandwidth control device of this invention is installed in an editing apparatuses. This invention, is not limited to this and the memory bandwidth control device of this invention can be installed in various kinds of information processing apparatuses such as personal computers and personal digital assistants (PDA).

Still-further, the above-described embodiment has described a case where the PBA circuit 81A of the I/O buffer W 81 and the PBA circuit of the I/O buffer R 82 serving as a control means dynamically assigns memory bandwidth. This invention, however, is not limited to this and the memory bandwidth can be assigned with another circuit configuration.

This invention can be applied to various information processing apparatuses for communicating data via memories, for example.

While there has been described in connection with the preferred embodiments of the invention, it will be obvious to those skilled in the art that various changes and modifications may be aimed, therefore, to cover in the appended claims all such changes and modifications as fall within the true spirit ad scope of the invention.

What is claimed is:

1. A memory bandwidth control device comprising:

a memory used for temporarily storing and outputting data to be communicated with external devices being connected via an input/output ports; and a controller for dynamically assigning memory bandwidth to input/output ports of external devices issuing data transfer requests in response to receiving data transfer requests of the data to the memory from the external devices, wherein the memory bandwidth is assigned in accordance with required memory bandwidth and an order of the data transfer requests, wherein the assigned memory bandwidth changes dynamically in accordance with receiving data transfer requests.

2. The memory bandwidth control device according to claim 1, wherein the controller sets the number of input/output ports effective to the memory, within a range of the memory bandwidth.

3. The memory bandwidth control device according to claim 1, wherein the controller comprises a selector for temporarily storing data from external devices into a write-only buffer when receiving writing requests from the external devices or temporarily storing data read from the memory, into a read-only buffer when receiving readout requests from external devices, and dynamically assigning use permission to the write-only buffer accepting the writing requests or the read-only buffer accepting the readout requests.

4. The memory bandwidth control device according to claim 1, wherein the selector performs burst transfer of the data stored in the write-only buffer or the read-only buffer to the memory, a prescribed data amount at a time.

5. A memory bandwidth control method comprising:

a data transfer request acceptance step of accepting data transfer requests of data to a memory, the data communicated with external devices being connected via input/output ports, the memory used to temporarily store and output the data; and a control step of dynamically assigning memory bandwidth to input/output ports of external devices issuing the data transfer requests, wherein the memory bandwidth is assigned in accordance with required memory bandwidth and an order of the data transfer requests, wherein the assigned memory bandwidth changes dynamically in accordance with receiving data transfer requests.

6. A computer readable medium storing a computer program comprising:

a data transfer request acceptance step of accepting data transfer requests of data to a memory, the data communicated with external devices being connected via input/output ports, the memory used to temporarily store and output the data; and a control step of dynamically assigning memory bandwidth to input/output ports of external devices issuing the data transfer requests, an assigning step of assigning the memory bandwidth according to required memory bandwidth and an order of the data transfer requests, dynamically changing the assigned memory bandwidth according to receiving data transfer requests.

* * * * *